(12) United States Patent
Betting et al.

(10) Patent No.: US 8,257,458 B2
(45) Date of Patent: Sep. 4, 2012

(54) CYCLONIC FLUID SEPARATOR

(75) Inventors: Marco Betting, Rijswijk (NL); Max Robert Anthony ter Haar, Rijswijk (NL); Frederick Albert Lammers, Zoetermeer (NL); Cornelis Antonie Tjeenk Willink, Rijswijk (NL)

(73) Assignee: Twister B.V., Rijswijk (NL)

( * ) Notice: Subject to any disclaimer, the term of this patent is extended or adjusted under 35 U.S.C. 154(b) by 190 days.

(21) Appl. No.: 12/593,260

(22) PCT Filed: Mar. 6, 2008

(86) PCT No.: PCT/EP2008/052703
§ 371 (c)(1),
(2), (4) Date: Mar. 12, 2010

(87) PCT Pub. No.: WO2008/116732
PCT Pub. Date: Oct. 2, 2008

(65) Prior Publication Data
US 2010/0319533 A1 Dec. 23, 2010

(30) Foreign Application Priority Data
Mar. 26, 2007 (EP) .................................... 07104888

(51) Int. Cl.
*B01D 46/00* (2006.01)
(52) U.S. Cl. ................. 55/416; 55/447; 55/449; 55/458; 55/456; 55/410; 55/412; 55/414; 55/406; 55/407
(58) Field of Classification Search .................. 55/396, 55/447, 459.1, 468, DIG. 14; 96/389, 380, 96/381; 210/787, 512.1; 95/269, 34, 29
See application file for complete search history.

(56) References Cited

U.S. PATENT DOCUMENTS

| 2,569,909 A | 10/1951 | Edward | |
|---|---|---|---|
| 7,357,825 B2 * | 4/2008 | Betting et al. | .................. 55/447 |
| 2004/0262218 A1 * | 12/2004 | Betting et al. | ............. 210/512.1 |
| 2009/0205488 A1 * | 8/2009 | Betting et al. | .................... 95/30 |

FOREIGN PATENT DOCUMENTS
WO   WO 03/029739 A2   4/2003

OTHER PUBLICATIONS
PCT International Preliminary Report in re PCT/EP2008/052703 dated Mar. 2, 2009, 9 pages.

* cited by examiner

*Primary Examiner* — Jason M Greene
*Assistant Examiner* — Dung H Bui
(74) *Attorney, Agent, or Firm* — Fliesler Meyer LLP

(57) ABSTRACT

A cyclonic fluid separator has a tubular housing (10) in which the fluid is accelerated and swirl imparting means (2) for inducing the fluid to swirl through an annular space between the housing and a central body (1) mounted within the housing (10), which central body (1) is provided with resonance abatement means, such as: tensioning means (20,22) which apply a tension load to an elongate tail section (8) of the central body (1) such that the natural frequency of the central body (1) is increased; vibration dampening means (31,50,60), which inhibit vibration of at least part (8) of the central body (1); solid particles (31) arranged in a segmented tubular tail section (8) of the central body (1), a viscous liquid (50) arranged between a tubular tail section (8) of the central body (1) and a tensioning rod (51), apertures (60) drilled radially through a tail section (8) of the central body (1); and/or a low pressure fluid (80) injected through a central opening (82) in the central body (1).

16 Claims, 4 Drawing Sheets

CYCLONIC FLUID SEPARATOR

BACKGROUND OF THE INVENTION

The invention relates to a cyclonic fluid separator.

Gas mixtures may be separated by expanding and thereby cooling the mixture such that condensable components condense and then separating the gaseous components from the condensed liquid components in a cyclonic separator.

International patent application WO03029739 discloses a cyclonic separator comprising a throat section in which the fluid may be accelerated to a transonic or supersonic velocity and swirl imparting means for inducing the fluid to swirl through an annular space between the housing and a central body, which is arranged substantially co-axially relative to a central axis of the housing.

The fluid mixture that flows at high velocity through the annular space between the inner surface of the housing and the outer surface of the central body may exert vibrating forces on the housing and the central body.

It is also desired to streamline the central body, which may involve configuring the central body such that is has a droplet shaped front section and an elongate slender tail section. This tail section may be short or long and may be supported or unsupported by the housing. Vibrations of the central body may have a detrimental effect on the fluid flux and separation performance of the device and may damage and even cause failure of the central body.

It is an object of the present invention to solve the problem of vibration of the central body of a cyclonic fluid separator.

SUMMARY OF THE INVENTION

In accordance with the invention there is provided a cyclonic fluid separator with a tubular housing in which the fluid is accelerated and swirl imparting means for inducing the fluid to swirl through an annular space between the housing and a central body mounted within the housing, which central body is provided with resonance abatement means.

Optionally the resonance abatement means are configured to increase the natural frequency of the central body and/or to dampen vibrations of at least part of the central body.

To achieve this the central body may comprise a tubular tail section, which is at least partially filled with solid particles and/or a viscous liquid and which may be subject to a predetermined axial tension.

Furthermore, a tension rod may be arranged in the tubular tail section of the central body, such that an annular gap is present between the outer surface of the tension rod and the inner surface of the tubular tail section of the central body, which annular gap is at least partially filled with a viscous liquid.

Alternatively, the central body may comprise a porous tail section, such that pressure differences between opposite sides of the tail section are reduced and vibration of the tail section resulting from any varying pressure differences between said opposite sides of the tail section is inhibited.

In such case the central body may have a droplet shaped front section and an elongated substantially cylindrical tail section which is made substantially porous by perforating the tail section by substantially radial holes that are distributed along the length of the tail section, which holes are also distributed at regular tangential intervals along the circumference of the tail section.

In another embodiment of the cyclonic fluid separator according to the invention the central body comprises a longitudinal opening having a longitudinal axis which substantially coincides with the central axis, which longitudinal opening is configured as a duct through which in use a low pressure fluid is injected into the tubular housing, which low pressure fluid is mixed with the fluid flowing through the throat section in a substantially cylindrical section of the housing that is located downstream of the throat section and which low pressure fluid has a lower static pressure than the fluid flowing via the throat section into the substantially cylindrical section of the housing.

In such case the tubular housing may comprise a tail section in which a central gas enriched fluid outlet is arranged, which is surrounded by an annular liquid enriched fluid outlet and wherein a recycle conduit is arranged between the annular liquid enriched fluid outlet and the longitudinal opening in the central body for recycling liquid enriched fluid as a low pressure fluid from the annular liquid enriched fluid outlet into the longitudinal opening in the central body.

The throat section of the cyclonic fluid separator according to the invention may be configured such that in use the fluid accelerated to a substantially sonic or supersonic velocity in the throat section and thereby cooled such that one or more condensable components condense in the throat section.

In accordance with the invention there is also provided a method of separating a fluid mixture with the separator according to the invention, wherein the method is used to obtain a purified natural gas stream from a contaminated natural gas stream comprising solid contaminants, such as sand and/or other soil particles and/or condensable contaminants, such as water, condensates, carbon dioxide, hydrogen sulphide and/or mercury.

These and other features, objects, advantages and embodiments of the cyclonic separator and method according to the invention are described in the accompanying claims, abstract and following detailed description of preferred embodiments in which reference is made to the accompanying drawings.

DETAILED DESCRIPTION OF DEPICTED EMBODIMENTS

Figure 1:
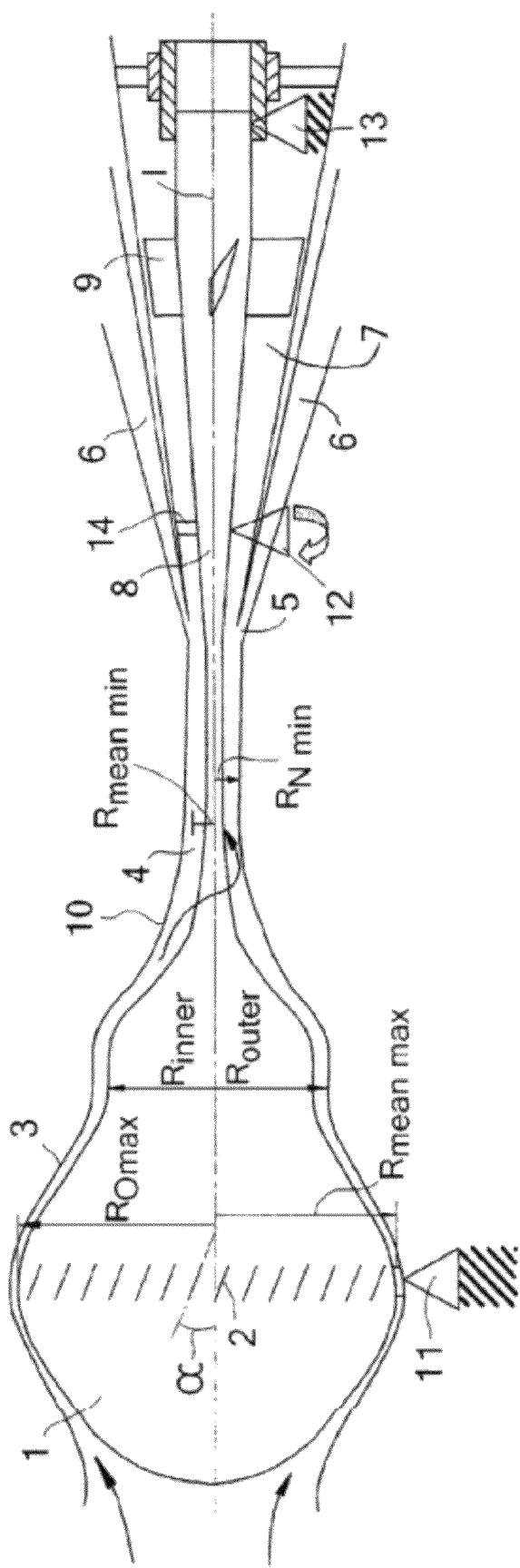
FIG. 1 is a schematic longitudinal sectional view of a cyclonic separator with a central body having an elongate tail section.

In the accompanying FIGS. 1-8 similar reference numerals are used, where appropriate, to denote similar components of similar embodiments of the cyclonic fluid separators depicted therein.

Referring now to FIG. 1, there is shown a cyclonic inertia separator which comprises a swirl inlet device comprising a streamlined droplet-shaped central body 1 on which a series of swirl imparting vanes 2 are mounted and which is arranged co-axial to a central axis I of the separator and inside the separator housing 10 such that an annular flow path 3 is created between the central body 1 and separator housing 10. The separator further comprises an annular throat portion 4 from which in use the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongated tail section 8 on which an assembly of flow straightening blades 9 is mounted. The central body 1 preferably has a largest outer width or diameter 2 $R_{o\ max}$, which is larger than the smallest inner width or diameter 2 $R_{n\ min}$ of the annular throat portion 4.

The swirl imparting vanes 2 are oriented at an angle ($\alpha$) relative to the central axis I to create a circulation ($\Gamma$) in the fluid stream. It is preferred that $\alpha$ is between 20° and 50°. The fluid stream is subsequently induced to flow into the annular flow area 3. The cross-sectional surface of this area is defined as: $A_{annulus} = \pi \cdot (R_{outer}^2 - R_{inner}^2)$.

The latter two being the outer radius and inner radius of the annulus at a selected location.

The mean radius of the annulus at that location is defined as:

$$R_{mean} = \sqrt{[\tfrac{1}{2}(R_{outer}^2 + R_{inner}^2)]}$$

At the maximum value of the mean annulus radius $R_{mean, max}$ the fluid stream is flowing between the assembly of swirl imparting vanes 2 at a velocity (U), which vanes deflect the flow direction of the fluid stream proportional to the deflection angle ($\alpha$) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean, max}$ to $R_{mean, min}$.

It has been found that during this annular expansion two processes occur:

(1) The heat or enthalpy in the flow (h) decreases with the amount $\Delta h = -\tfrac{1}{2}U^2$, thereby condensing those flow constituents which first reaching phase equilibrium.

This results in a swirling mist flow containing small liquid or solid particles.

The tangential velocity component increases inversely with the mean annulus radius $U\phi$ substantially in accordance with the equation:

$$U_{\phi, final} = U_{\phi, initial}(R_{mean, max}/R_{mean, min})$$

This results in a strong increase of the centrifugal acceleration of the fluid particles ($a_c$), which will finally be in the order of:

$$a_c = (U_{\phi, final}^2/R_{mean, min}).$$

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing, which is called the separation area. The time period for the particles to drift to this outer circumference of the flow area determines the length of the tubular throat portion 4.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components discharged into an outer wet fluid outlet 6 via one slot or a series of slots, (micro) porous portions whereas the 'dry' gaseous components are discharged into the central dry fluid outlet conduit 7.

In the diverging central dry fluid outlet conduit 7 the fluid stream is further decelerated so that the remaining kinetic energy is transformed into potential energy. The diverging central dry fluid outlet conduit 7 can be equipped with an assembly of flow straightening vanes 9 to recover the circulation energy.

The gas mixture enters the separator shown in FIG. 1 at the left. The gas is guided over the central body 1 through a narrow, ring-shaped flow duct, whilst gaining angular momentum induced by the guiding vanes 2 placed around the perimeter of the central body 1. The swirling flow is expanded along the annular duct 4. The swirl gains strength while expanding in the contraction towards section 4. During the expansion, the high boiling gas components will start to condense between the swirl imparting vanes 2 and the throat section 4 while the lower boiling components will start to condense between the throat section 4 and the vortex finder of the fluid separation chamber 5. The resulting droplets are transported to the outer perimeter of the flow area due to the imposed centrifugal forces of the swirling motion. At the vortex finder 5 the flow is split into a wet stream at the outer perimeter of the flow, and a dry stream in the core of the flow.

Figure 8:
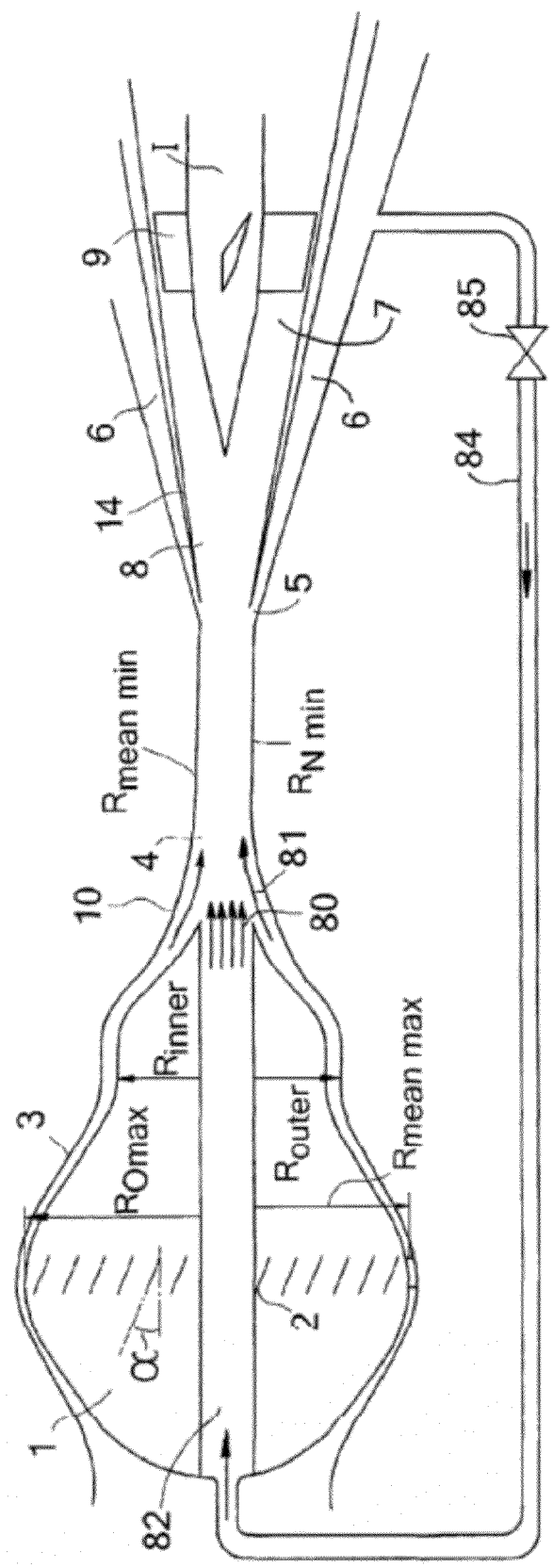
FIG. 8 is a schematic longitudinal sectional view of a cyclonic fluid separator with a central body having a central opening through which a low-pressure fluid is injected to inhibit fluid induced vibrations.

By extending the central body 1 with an elongated tail section 8, the steep increase of tangential momentum towards the central axis of the vortex flow, is restricted thereby avoiding flow instability (i.e. vortex break down). The presence of the centrally placed droplet-shaped central body 1 with elongated tail section 8 is beneficial to provide a supersonic cyclonic separator with high separation efficiency. High separation efficiency is obtained through maximizing the angular momentum in the flow. However increasing the angular momentum is limited by the occurrence of vortex breakdown. The latter strongly diminishes the angular momentum. The droplet shaped central body 1 allows for an increase of angular momentum in the cross section flow—compared to a flow area without central body—without the occurrence of vortex breakdown. Alternatively said restriction provided by the elongated tail end section can be obtained by injecting a low pressure fluid through a longitudinal opening at the end of the droplet shaped central body as shown in FIG. 8.

Considering a central body 1 comprising an elongated tail end section 8, centrally placed in a cylindrical flow duct in which a flow is established. An infinitesimal small displacement from an initial radial position $r=(x_0, y_0)$ to a new radial position $r=(x_1, y_1)$, will cause the flow to accelerate in the part of the flow cross-section where the central body has been displaced to, and decelerate in the part of the flow cross section from which the central body 1 was displaced. Clearly the resulting static pressure difference will generate a lift force, which by definition is normal to the surface of the central body 1. This normal force will cause further bending, leading to a new radial position $r=(x_2, y_2)$ etc. etc. The magnitude of the final displacement is a result of the flow force (i.e. normal force) on one hand, counteracted by the bending stiffness of the central body 1 (i.e. reaction force per unit displacement) on the other hand. If the bending stiffness of the central body 1 is sufficiently high, the resultant force has a direction opposite to the direction of displacement, for which holds that the central body structure behaves as a mass-spring system. If however the bending stiffness is insufficient the resultant force is in the direction of the displacement and the central body 1 will be displaced towards the boundary of the housing 10 or until material rupture due to a load beyond the ultimate strength limit. The bending stiffness will merely depend on: Moments of Inertia (i.e. central body shape), Modulus of Elasticity of the material (E) and the Pretension Force imposed on the central body 1.

Forces exerted by the swirling fluid flux on the central body 1 can be calculated as follows.

Considering a central body 1 centrally placed in a cylindrical flow duct but now with a vortex flow present. An infinitesimal small displacement from an initial radial and tangential position $[r, \phi]=(x_0, y_0)$ to a new position $[r, \phi]=[x_1, y_1]$, will not only cause a force normal to the central body surface, but also a force tangent to the central body surface which causes a disposition in tangential direction. This tangential movement of the central body is not restraint by its bending stiffness—which only works in radial direction—hence an ongoing pivoting movement of the central body results. To avoid an increasing pivoting motion, a dampening mechanism is required to stabilize the central body.

Summarizing the above, a static stable central body 1 behaves like a mass-spring system hence will oscillate in a harmonic mode at its natural frequency as long as the flow is exciting the central body 1. The corresponding amount of free resonance energy needs to be removed from the system (i.e. needs to be dissipated). Therefore a dampening mechanism is required to obtain dynamic stability. Alternatively the mass-stiffness of the central body structure can be increased to the point that its natural frequency becomes so high that the period of the oscillation is small compared to the retention time of gas flow. In that case the flow will not exert a defined lift force on the central body 1, hence is not excited. In addition the lift forces on the central body 1 can be suppressed by radially oriented openings throughout the central body cross section balancing the pressure between lower and upper side.

Suitable ways to support the droplet shaped central body 1 with an elongate tail section 8 such that vibrations are inhibited are described herein below.

In the embodiment shown in FIG. 1 the swirl imparting vanes 2 and the de-swirling vanes 9 support the central body 1 with an elongated tail section 8 within the tubular separator housing 10. Since the swirl imparting vanes 2 and de-swirling vanes 9 protrude into the fluid flow, it is preferred to place these in the low speed areas of the flow (<200 m/s) as to avoid unnecessary pressure loss. The triangles 11,12, and 13 show how in the supersonic cyclonic separator shown in FIG. 1 the droplet shaped central body 1 with elongated tail section 8 may be supported within the tubular separator housing 10:
1) a fixed support 11 is provided by the swirl imparting vanes 2,
2) a radial restraint support 12 is provided by spacer ribs 14 in the dry gas outlet conduit 7, and
3) a fixed support 13 in the dry gas outlet conduit 7 downstream of the de-swirling vanes (9).

By choosing the support types and support locations for a given central body geometry, its mode shape is determined as well as its moments of inertia. The number of support points can be any number larger than or equal to 2 depending on the specific geometry of the supersonic cyclonic separator.

By applying a pretension load on the central body 1 with elongate tail section 8 the bending stiffness increases i.e. the static stability increases and therefore its natural frequency increases. It will understood that increasing the natural frequency of the central body will also enhance the actual dampening. Since the pretension load can go up to an average tensile stress of 5000 MPa in the cross section of the tail section 8 of the central body 1. In the case of a high pretension load>1000 MPa, it is preferred to avoid thread connections.

Figure 2:
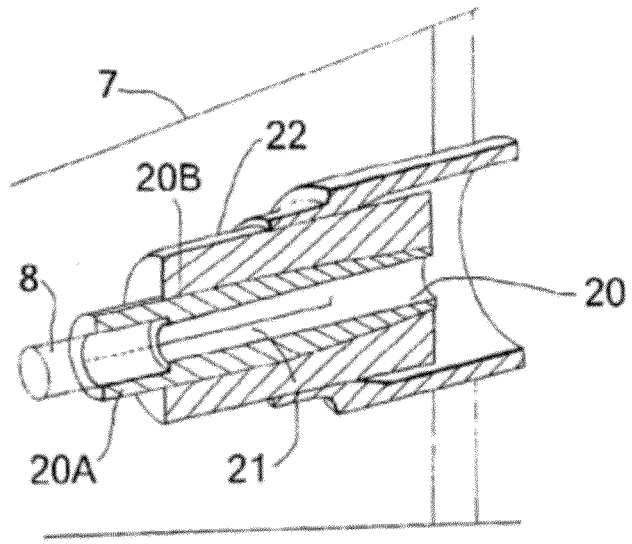
FIG. 2 depicts at a larger scale a schematic three-dimensional view of the clamp construction, which applies a tension load to the downstream end of the tail section of the central body shown in FIG. 1.

Therefore a special clamp construction as shown in FIG. 2 may be used to hold the downstream end, and optionally also the upstream end, of the central body 1, 8 in position, and taking up the tensile load.

The downstream end of the tail section 8 of the central body 1 is clamped in a conical tube 20 in which longitudinal grooves 21 can be cut to provide conical wedges 20A, 20B. This wedged conical tube 20 is tightly squeezed between the outer surface of the tail section 8 of the central body 1 and the inner surface of the clamp housing 22, as soon as an axial load is applied on the central body 1.

Suitable materials for constructing a central body 1 with an elongated tail section 8 are:
materials with a high modulus of elasticity, or E-modulus, in order obtain sufficient material stiffness,
materials with a high yield strength in order to enable high tension load to increase stiffness,
impact load in order to warrant operational robustness; and
materials with a high resistance against corrosion and hydrogen embrittlement to avoid hydrogen induced cracking, within an low temperature range, typically from 0° C. down to −100° C.

Two types of materials comply with these requirements:
1) high grade hardened steel alloys and,
2) unidirectional carbon fibre reinforced resins.

Suitable high grade hardened steel alloys (1) are cold worked alloys containing at least the following components: Chromium, Nickel, Molybdenum and Cobalt.

Suitable unidirectional carbon fibre reinforced resins (2) comprise High Modulus carbon fibres with a filling percentage of at least 40 vol %. Optionally filling the voids between the fibres with nano tubes can further reinforce the fibre matrix.

A resonance dampener may be used to dissipate the vibration energy extracted from the flow, in order to avoid dynamic instability (i.e. increase of deflection/displacement). The oscillation mode is determined by the first mode shape of the central body 1 with elongate tail section 8 and the distances between the support points 11,12 and 13.

The higher the bending stiffness and the lower the specific mass of the central body 1 with elongate tail section 8, the higher its natural frequency. For a given level of excitation power—exerted on the central body—a higher natural frequency yields a smaller deflection of the central body. The lower limit of the maximum allowable deflection is determined by the flow disturbance caused by the deflection and typically ranges between 1% and 5% of the smallest diameter of the central body. The upper limit of the maximum allowable deflection—typically ranging from 5% to 50% of the smallest diameter of the central body—is determined by the yield strength of the material and the moment of inertia of the central body shape, since an increase of deflection causes an increase in stress in the central body in the proximity of the support points. In general it can be stated that the higher the bending stiffness the higher the stress level per unit deflection, hence the lower the upper limit of allowable deflection.

However, this is compensated because the higher the bending stiffness the higher the natural frequency and the smaller the actual deflection.

Figure 3:
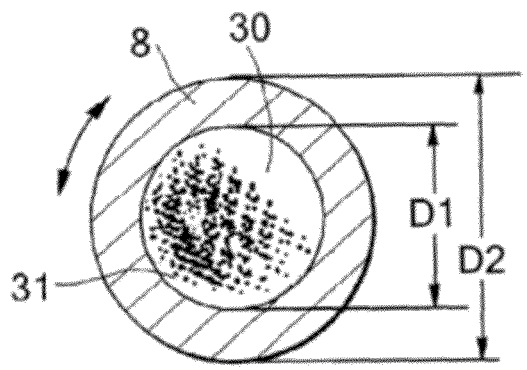
FIG. 3 is a cross-sectional view of a segmented tubular tail section of the central body shown in FIG. 1, which is filled with solid particles.
Figure 4:
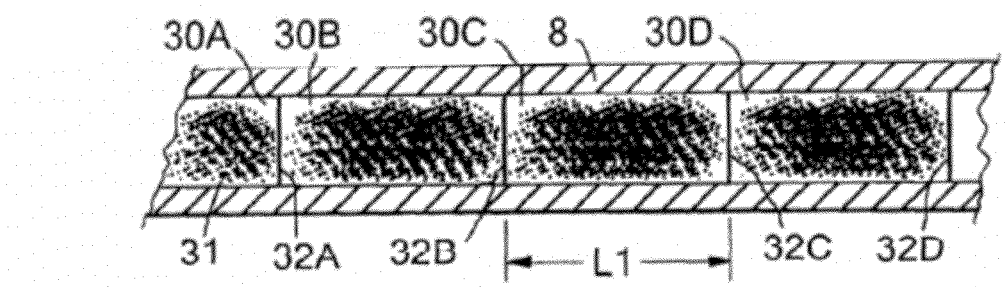
FIG. 4 is a longitudinal sectional view of the segmented tubular tail section shown in FIG. 3.
Figure 5:
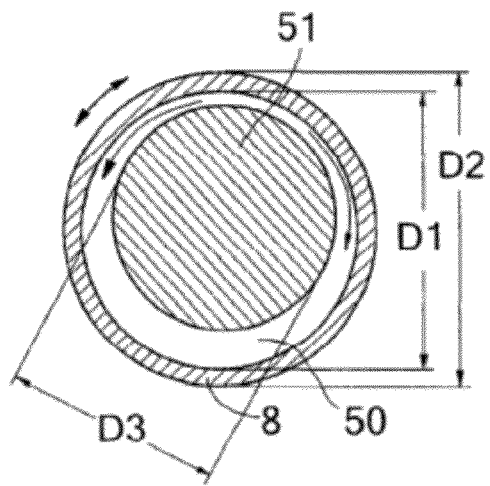
FIG. 5 is a cross-sectional view of tubular tail section of the central body shown in FIG. 1, which is filled with a viscous liquid and arranged around a tensioning rod.

FIG. 3-5 illustrate two concepts, which diminish the resonance levels in the central body 1 with elongated tail section 8 shown in FIG. 1 within the limits of maximum deflection:
1) Particle dampener shown in FIGS. 3 and 4, and
2) Viscous liquid dampener shown in FIG. 5.

The particle dampener shown in FIGS. 3 and 4 comprises one or more cylindrical cavities 30 inside the tail section 8 of the central body 1, which cavities 30 are at least partly filled with small particles 31. The principle of the particle dampener is that the majority of the particle mass is brought into a movement due to the vibration of the tail section 8 of the central body 1 induced by the flow forces. The majority of the particle mass should make an oscillatory movement out of phase with the oscillation of the tail section 8 of the central body 1 itself. The oscillation energy of the tail section 8 is then dissipated through collision between particles and the wall of the tail section 8 of the central body 1 and collisions between particles mutually.

The filling or packing rate should be at least 60% (excluding the pore volume between the particles which is typically 25-30% vol. %) with a maximum filling rate of 95%. The preferred filling rate is between 75 and 85%. The particles 31 may have diameters d that may vary between 0.1 and 5 mm and that preferably are between 0.6 and 2.2 mm. However a better measure is ratio d/D1 of the particle diameter d divided by the internal diameter D1 of the tail section 8, which may vary between 0.04 and 0.25. The ratio d/D1 is preferably selected in the range of 0.12 and 0.2. The mass density of the particle material is chosen high, at least above 3 kg/m$^3$, preferably above 8 kg/m$^3$. The material of the particles 31 should be extremely wear resistant. A suitable material for the particles 31 is Tungsten Carbide (WC). The voids between the particles 31 can be filled with air or another suitable gas. It is also possible to use a liquid for this purpose provided the viscosity is not extremely high.

The preferred dimensions of the cylindrical cavity 30 in the tail section 8 are between $D1_{min}=0.4*D2$ and $D1_{max}=0.8*D2$.

It is furthermore preferred to apply a segmentation in longitudinal direction of the tail section 8 as to avoid particles 31 to concentrate in one of the outer ends of the cylindrical cavity 30 i.e. to ensure the particle distribution is as uniform as possible over the length scale of the tail section 8 of the central body 1.

FIG. 5 shows a tail section 8 comprising a series of cavities 30A-30D, which are filled with particles 31 and which are separated by separation disks 32A-32D. The preferred length scale of each cavity segment 30A-30D is between $L1=1*D1$ and $L1=4*D1$. The preferred filling rate is =75-85 vol % of particles 30 per segment 30A-30D.

FIG. 5 shows a tail section 8 of a central body 1, which is equipped with a liquid dampener. The liquid dampener is arranged in a tubular tail section 8 of the central body 1, which is filled with a viscous liquid 50 and in which a tension rod 51 is arranged. The annular gap between the outer diameter of the tension rod and the inner diameter of the tubular tail section 8 of the central body 1 is filled with a viscous fluid 50.

The tension rod 51 is put under a high tensile force, yielding an average tensile stress between 1000-5000 MPa. The tail section 8 of the central body 1 is mounted either without pretension or with a slightly elevated pretension, yielding an average tensile stress between 0-500 MPa. Because the natural frequency of the tension rod 51 is much higher than the natural frequency of the tubular tail section 8 of the central body 1 itself, relative movement between the rod 51 and the tail section 8 exists if the tail section 8 is excited. As a result the viscous fluid 50 present in the gap between the rod 51 and the tail section 8 is displaced in an alternating mode. In this way the resonance energy, gained by the elongate tail section 8 of the central body 1, is dissipated by viscous forces in the alternating moving fluid 50. The viscous fluid 50 can be any vapour, liquid, liquid-liquid emulsion or solid-liquid suspension with a dynamic viscosity between $10^{-4}$ and $10^{-2}$ Pa·s in a temperature range between 240-270 K. Preferably the viscous fluid is non-corrosive and preferably its viscosity is only weakly depending on temperature. A suitable viscous fluid is a non-Newtonian fluid. For instance a shear-thinning fluid may be applied in order to maximize the dampening in the small amplitude range i.e. when the relative movement between the rod and the central body is small.

The material of the tail section 8 of the central body 1 can be any suitable corrosion resistant alloy (e.g. AISI316, Inconel, Incolloy, MP35N, etc) or a fibre reinforced material (resin/alloy). The tension rod 51 may be made of a material with a high tensile strength such as MP35N, Maraging or a carbon fibre reinforced epoxy matrix.

The preferred dimensions of the annular gap between of the inner surface of the tubular tail section 8 having an inner diameter D1 and an outer diameter D2 and a tension rod having an outer diameter D3 are as follows:

$D1_{min}=0.60*D2$:$D1_{max}=0.95*D2$ $D3_{min}=0.70*D1$:$D3_{max}=0.95*D1$

Figure 6:
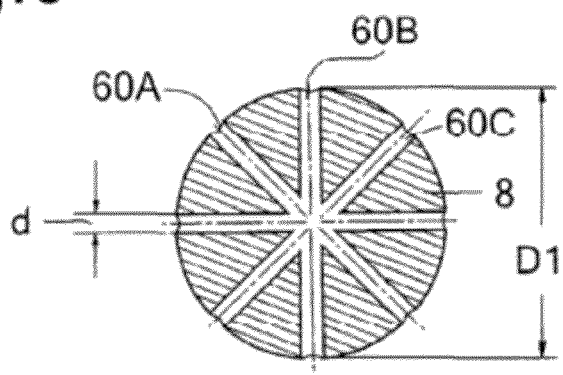
FIG. 6 is a cross-sectional view of a perforated elongated tail section of the central body shown in FIG. 1.
Figure 7:
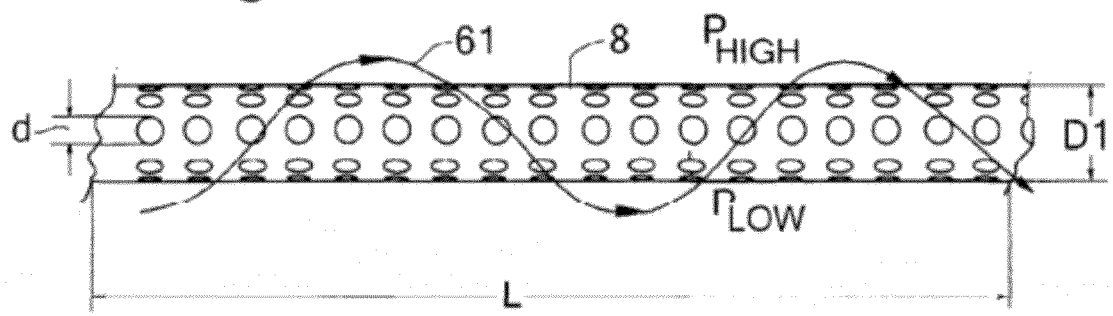
FIG. 7 is a longitudinal sectional view of the perforated elongated tail section shown in FIG. 6.

FIGS. 6 and 7 show an embodiment of the elongated tail section 8, wherein the tail section is perforated by radial apertures 60 in order to create a substantially porous tail section 8. The apertures 60 serve to inhibit radial forces exerted by the swirling fluid flow 61 around the tail section 8. In order to avoid destabilization of the tail section 8 of the central body 1, which is exposed to normal forces exerted by the swirling vortex flow 61, the surface of the tail section 8 of the central body 1 is partially porous, allowing for equalization of pressure perturbations around the elongated tail section 8 of the central body 1.

When considering an elongated cylindrical tail section 8 surrounded by a confined vortex flow 61, a deflection of the tail section 8 in radial direction would normally create a normal force acting in the same direction as the deflection. This normal force results from a low static pressure $P_{low}$ in the swirling fluid flow 61 at an upper surface of the tail section 8, while at the opposite lower surface of the tail section 8 a high pressure $P_{high}$ exists. The apertures 60 serve to equalize this pressure differential $\Delta(P_{high}-P_{low})$ by connecting opposite sides of the tail section 8 by means of diametrically drilled apertures.

FIG. 6 illustrates and embodiment wherein three apertures 60A-C are drilled at regular tangential intervals of 60 degrees through one cross sectional surface of the tail section 8 to inhibit pressure differences between the fluid flux at different sides of the tail section 8.

Typically the number (n) of apertures 60 per cross section of the tail section 8 may vary from a minimum of 2 up to 40 depending on the characteristic size of the of the aperture 60. The smaller the ratio d/D1 between the diameter of the aperture 60 and the diameter of the tail section 8 the larger n can be. It is preferred to restrict the minimum value of d/D1$\geq$0.03 and the maximum value of d/D1$\leq$0.3. The minimum value of d/D1 is determined by the risk of plugging the holes with debris or ice/hydrates which increase if d becomes smaller, while the maximum is governed by the disturbance of the surface discontinuity on the vortex flow which becomes larger when d increases. Once the ratio d/D1 is chosen the suppression of the normal flow forces is determined with the total number of holes (N) which follows from the number of holes per cross section (n) times the number of perforated cross sections along the length scale (i). The total surface porosity defined as $P=n*(d^2/D1)*(i/L)$ can range between $0.1 \leq P \leq 0.8$ though it is preferably between 0.3 and 0.6.

FIG. 8 shows an embodiment of the cyclonic separator according to the invention wherein the functionality of elongated tail section 8 of the separators shown in FIG. 1-7 is replaced by injecting a low pressure fluid 80 through a central opening 82 of the central body 1 into the core of the vortex 81 flowing through the tubular housing 10 of the separator. A swirling motion can be imposed to the low pressure fluid prior to injection via the central opening 82. This swirling motion can be either co-current or counter-current to the swirling motion of the high pressure flow.

The entrance momentum of the low pressure fluid 80 will be low compared to the momentum of the high pressure flow 81 passing along the outer surface of the central body 1. Extensive momentum exchange will occur in the elongate tubular fluid separation section 4 of the device where the low pressure fluid 80 is propelled by the high pressure swirling fluid 81. Likewise the central body 1, tangential momentum in the high pressure swirling fluid 81 is limited by the presence of a low momentum flow in the core of the tube section 4. As the swirling high pressure fluid flux 81 will loose tangential momentum, the low pressure fluid flux 80 will gain tangential momentum. The low pressure fluid flux 80 in total will mix with the swirling high pressure fluid flux 81 and accelerated in the tubular separation section 4.

The liquids formed by nucleation and condensation will be offered sufficient retention time in the tubular separation section 4 that these are separated in the vortex flow to the outer perifery of the tube.

The low pressure fluid may be a fraction of the liquid enriched 'wet' fluid flowing from the annular wet gas exhaust conduit 6, which is recirculated into the opening 82 within the central body 1 via wet gas recycling conduit 84. The wet gas recycling conduit 84 is equipped with a control valve 85 to control the low pressure fluid flow rate 80 such that is between 5 and 80% of the fluid flow rate of the high pressure fluid 81. It is preferred that the low pressure fluid flow rate 80 is between 25 and 60% of the high pressure fluid flow rate.

The invention claimed is:

1. A cyclonic fluid separator with a tubular housing (10) in which the fluid is accelerated and swirl imparting means (2) for inducing the fluid to swirl through an annular space between the housing and a central body (1) mounted within the housing (10), characterized in that the central body (1) is provided with resonance abatement means, wherein the resonance abatement means comprise:
tensioning means (20,22) which apply a tension load to an elongate tail section (8) of the central body (I) such that the natural frequency of the central body (1) is increased, wherein the tensioning means (20, 22) comprise a clamp construction to hold the downstream end of the central body (1) in position, the clamp construction comprising a conical tube (20) and a clamp housing (22), wherein the conical tube (20) is tightly squeezed between the outer surface of the tail section (8) of the central body (1) and the inner surface of the clamp housing (22).

2. The cyclonic fluid separator according to claim 1, wherein the central body (1) comprises a tubular tail section, which is at least partially filled with solid particles and/or a viscous liquid, wherein the viscous liquid is a vapour, liquid, liquid-liquid emulsion or solid-liquid suspension with a dynamic viscosity between $10^{-4}$ and $10^{-2}$ Pa·s in a temperature range between 240-270 K.

3. The cyclonic fluid separator of claim 1, wherein the central body (1) comprises a droplet shaped section, which has a longitudinal axis of symmetry which is substantially co-axial to a central axis of the tubular housing, such that an annular fluid channel (3) is created between the outer surface of the central body (1) and the inner surface of the tubular housing, in which annular fluid channel (3) a series of swirl imparting vanes (2) are arranged, which swirl imparting vanes (2) are arranged around a large diameter mid section of the droplet shaped section and which annular fluid channel (3) provides a throat section (4) which is arranged around a section of the central body (1) having a smaller outer diameter than the mid section of the central body (1).

4. The cyclonic fluid separator of claim 1, wherein the throat section is configured such that in use the fluid accelerated to a substantially sonic or supersonic velocity in the throat section (4) and thereby cooled such that one or more condensable components condense in the throat section.

5. The cyclonic fluid separator of claim 1, wherein the resonance abatement means further comprise one or more of the following vibration dampening means, which inhibit vibration of at least part of the central body (1)
solid particles (31) arranged in a segmented tubular tail section (8) of the central body (1);
a viscous liquid (50) arranged between a tubular tail section (8) of the central body (1) and a tensioning rod (51);
apertures (60) drilled radially through a tail section (8) of the central body (1).

6. Cyclonic fluid separator according to claim 1, wherein a pretension load is applied on the central body, wherein the pretension load >1000 MPa.

7. Cyclonic fluid separator according to claim 1, wherein the conical tube (20) comprises longitudinal grooves (21) providing conical wedges (20A, 20B).

8. The cyclonic fluid separator of claim 1, wherein the resonance abatement means comprise vibration dampening means, which inhibit vibration of at least part of the central body (1).

9. The cyclonic fluid separator of claim 8, wherein a tension rod (51) is arranged in the tubular tail section of the central body (1), such that an annular gap is present between the outer surface of the tension rod (51) and the inner surface of the tubular tail section of the central body (1), which annular gap is at least partially filled with a viscous liquid.

10. The cyclonic fluid separator of claim 8, wherein the viscous liquid is a shear-thinning non-Newtonian fluid.

11. The cyclonic fluid separator of claim 8, wherein the central body (1) comprises a porous tail section, such that pressure differences between opposite sides of the tail section are reduced and vibration of the tail section resulting from any varying pressure differences between said opposite sides of the tail section is inhibited.

12. The cyclonic fluid separator of claim 11, wherein the tail section of the central body (1) extends through at least a substantial part of the length of the tubular housing and is provided with holes that have a substantially radial orientation relative to a longitudinal axis of the tail section (8), and which holes provide fluid communication between opposite sides of the tail section (8) of the central body (1).

13. The cyclonic fluid separator of claim 12, wherein the central body (1) has a droplet shaped front section and an elongate substantially cylindrical tail section (8) which is made substantially porous by perforating the tail section (8) by substantially radial holes that are distributed along the length of the tail section (8), which holes are also distributed at regular tangential intervals along the circumference of the tail section (8).

14. A method of separating a fluid mixture, comprising:
providing a cyclonic fluid separator with a tubular housing (10) in which the fluid is accelerated and swirl imparting means (2) for inducing the fluid to swirl through an annular space between the housing and a central body (1) mounted within the housing (10), characterized in that the central body (1) is provided with resonance abatement means, wherein the resonance abatement means comprise tensioning means (20,22) which apply a tension load to an elongate tail section (8) of the central body (I) such that the natural frequency of the central body (1) is increased, wherein the tensioning means (20, 22) comprise a clamp construction to hold the downstream end of the central body (1) in position, the clamp construction comprising a conical tube (20) and a clamp housing (22), wherein the conical tube (20) is tightly squeezed between the outer surface of the tail section (8) of the central body (1) and the inner surface of the clamp housing (22); and using the cyclonic fluid separator to obtain a purified natural gas stream from a contaminated natural gas stream comprising solid contaminants and/or condensable contaminants.

15. The method of claim 14, wherein the cyclonic fluid separator further comprises resonance abatement means comprising one or more of the following vibration dampening means, which inhibit vibration of at least part of the central body(1)

solid particles (31) arranged in a segmented tubular tail section (8) of the central body (1);

a viscous liquid (50) arranged between a tubular tail section (8) of the central body (1) and a tensioning rod (51);

apertures (60) drilled radially through a tail section (8) of the central body (1).

16. The method of claim 14, wherein the solid contaminants are sand and/or soil particles, and the condensable contaminants are water, condensates, carbon dioxide, hydrogen sulphide and/or mercury.

* * * * *